United States Patent
Beuschel et al.

(10) Patent No.: US 12,196,189 B2
(45) Date of Patent: Jan. 14, 2025

(54) LINEAR DRIVE AND LINEAR DRIVE ARRANGEMENT

(71) Applicant: Conti Temic microelectronic GmbH, Ingolstadt (DE)

(72) Inventors: Michael Beuschel, Stammham (DE); Stefan Bauer, Geisenfeld (DE)

(73) Assignee: Conti Temic microelectronic GmbH, Ingolstadt (DE)

( * ) Notice: Subject to any disclaimer, the term of this patent is extended or adjusted under 35 U.S.C. 154(b) by 169 days.

(21) Appl. No.: 18/020,787

(22) PCT Filed: Aug. 4, 2021

(86) PCT No.: PCT/DE2021/200102
§ 371 (c)(1),
(2) Date: Feb. 10, 2023

(87) PCT Pub. No.: WO2022/033641
PCT Pub. Date: Feb. 17, 2022

(65) Prior Publication Data
US 2023/0304479 A1    Sep. 28, 2023

(30) Foreign Application Priority Data

Aug. 12, 2020 (DE) ..................... 10 2020 210 212.0

(51) Int. Cl.
*F03G 7/06* (2006.01)
*H02N 10/00* (2006.01)

(52) U.S. Cl.
CPC ......... *F03G 7/06143* (2021.08); *F03G 7/062* (2021.08); *F03G 7/064* (2021.08); *F03G 7/0665* (2021.08); *H02N 10/00* (2013.01)

(58) Field of Classification Search
CPC ...... F03G 7/06143; F03G 7/062; F03G 7/064; F03G 7/0665; F03G 7/0635; H02N 10/00
(Continued)

(56) References Cited

U.S. PATENT DOCUMENTS

| 7,256,518 B2 * | 8/2007 | Gummin ................. F03G 7/065 60/527 |
| 8,733,097 B2 * | 5/2014 | Mankame ............... F03G 7/065 60/527 |

(Continued)

FOREIGN PATENT DOCUMENTS

| CN | 1262063 C | 6/2006 |
| DE | 10257549 B3 | 8/2004 |

(Continued)

OTHER PUBLICATIONS

Office Action dated Mar. 17, 2021 from corresponding German patent application No. 10 2020 210 212.0.
(Continued)

*Primary Examiner* — Hoang M Nguyen (57) ABSTRACT

A linear drive comprises: a lever having a through bore; a rod which extends through the bore; a bearing supporting the rod; a shape memory alloy connected to the lever and a first fixed bearing, the shape memory alloy exerting a tensile force on the lever when electrical power is applied; and a restoring element connected to the lever and a second fixed bearing, the restoring element exerting a restoring force on the lever and counter to the tensile force. In a first state, the lever is tilted making a non-positive connection between the lever and the rod. In a second state the lever is displaced in parallel to and in the direction of the tensile force. In a third state the lever is tilted back releasing the non-positive connection. In a fourth state, the lever is displaced in parallel to and in the direction of the restoring force.

17 Claims, 9 Drawing Sheets

(58) Field of Classification Search
USPC .............................. 60/527–529; 310/306–307
See application file for complete search history.

(56) References Cited

U.S. PATENT DOCUMENTS

| | | | |
|---|---|---|---|
| 8,741,076 B2 * | 6/2014 | Gao | ........................ F03G 7/065 |
| | | | 60/527 |
| 9,819,287 B2 | 11/2017 | Mullner | |
| 2008/0247748 A1 | 10/2008 | Tanimura et al. | |
| 2010/0192567 A1 * | 8/2010 | Butera | .................... F03G 7/065 |
| | | | 60/527 |
| 2014/0007572 A1 * | 1/2014 | Buravalla | ............... F03G 7/065 |
| | | | 60/527 |

FOREIGN PATENT DOCUMENTS

| | | |
|---|---|---|
| DE | 19960949 B4 | 1/2006 |
| EP | 0045250 A1 | 2/1982 |
| EP | 2224131 A1 | 9/2010 |
| EP | 2140138 B1 | 4/2012 |
| EP | 3178567 B1 | 4/2020 |
| JP | H09252586 A | 9/1997 |
| WO | 2004032994 A2 | 4/2004 |

OTHER PUBLICATIONS

International Search Report and Written Opinion dated Nov. 15, 2021 from corresponding International patent application No. PCT/DE2021/200102.

* cited by examiner

LINEAR DRIVE AND LINEAR DRIVE ARRANGEMENT

The present invention relates to a linear drive and to a linear drive arrangement.

Linear drives are required for a wide range of applications, for example for positioning tasks, in valves or for adjusting optical systems. Generally, to this end, the rotational movement of a motor is converted into a linear movement of an adjustment element by means of a transmission arrangement. In addition, however, there are also direct linear actuators, for example solenoids, thermal actuators or shape memory alloy elements. For very short adjustment paths, these linear actuators can be used in linear drives.

Owing to their high energy density, the shape memory alloy elements represent a particularly compact and cost-effective option. Approaches for short-stroke linear drives using shape-memory alloy elements are already known.

For example, the document DE 10 257 549 B3 discloses a linear drive with a plurality of shape memory alloy wires arranged in a cascade-like manner.

Document JP H09252586 A uses a linear drive based on a shape memory alloy element with a pawl mechanism.

Document CN 1262063 C discloses a linear drive having a magnetostrictive shape memory alloy element acting in conjunction with a coupling mechanism.

However, all of these approaches are of complicated construction. In particular when coupling mechanisms or the like are used, the outlay on maintenance and the susceptibility of the linear drives to faults increase.

It is therefore the object of the present invention to provide a linear drive based on a shape memory alloy element, which is of particularly simple construction, remains functional over a long service life and is inexpensive and low-maintenance. It is a further object to provide a linear drive arrangement comprising such a linear drive.

These objects are achieved by a linear drive as claimed in patent claim 1 and by a linear drive arrangement as claimed in patent claim 15. Further advantageous configurations are the subject matter of the dependent claims.

According to a first aspect of the present invention, a linear drive is provided which has the following components: a lever element which has a through bore, a first portion spaced apart from the through bore and a second portion arranged between the first portion and the through bore; a rod element which extends along a rod axis and through the through bore; a bearing element which supports the rod element, the bearing element being designed to allow a movement of the rod element along the rod axis and to block a movement perpendicular to the rod axis; a shape memory alloy element which extends along a first axis and the length of which is adjustable by application of electrical power, wherein a first end of the shape memory alloy element is connected to the first portion, a second end of the shape memory alloy element opposite the first end is stationarily connected to a first fixed bearing, and the shape memory alloy element is designed to exert a tensile force acting along the first axis on the lever element when electrical power is applied; a restoring element extending along a second axis, wherein
a first end of the restoring element is connected to the second portion, a second end of the restoring element opposite the first end is stationarily connected to a second fixed bearing, and the restoring element exerts a restoring force on the lever element acting along the second axis and counter to the tensile force, wherein, in a first state, in which electrical power with a first power value is applied to the shape memory alloy element, the shape memory alloy element is shortened in such a way that the lever element is tilted owing to the tensile force exerted by the shape memory alloy element and, as a result, there is a non-positive connection between the lever element and the rod element, in a second state, in which electrical power with a second power value, which is greater than or equal to the first power value, is applied to the shape memory alloy element, the shape memory alloy element is further shortened in such a way that the tilted lever element is displaced parallel in the direction of the tensile force exerted by the shape memory alloy element and, as a result, brings about a movement of the rod element along the rod axis, in a third state, in which electrical power with a third power value, which is smaller than the first power value, is applied to the shape memory alloy element, the tilted lever element is at least partially tilted back and, as a result, the non-positive connection between the lever element and the rod element is released, and, in a fourth state, in which electrical power with a fourth power value, which is smaller than or equal to the third power value, is applied to the shape memory alloy element, the at least partially tilted back lever element is displaced parallel in the direction of the restoring force exerted by the restoring element.

With the linear drive according to the invention, a translatory movement of the rod element can be achieved effectively and reliably by means of the tensile force exerted on the lever element by the shape memory alloy element. The use of complex and costly couplings can be dispensed with here, which is why the linear drive according to the invention is particularly cost-effective and requires little maintenance. Furthermore, the linear drive according to the invention ensures a reliable movement of the rod element over a long service life, since, for example, in the event of wear in the region of the through bore, the lever element automatically adjusts itself relative to the rod element and therefore an angle which takes the wear into account and is adapted is produced between the rod element and the lever element, which in turn ensures a non-positive connection between the lever element and the rod element. After release of the non-positive connection, the lever element can then be moved back relative to the rod element in the direction of the restoring force acting on the lever element from the restoring element, without the rod element moving back noticeably. The reason for this is that the bearing element always has static friction which is inherently present and which acts counter to the movement back of the rod element.

In a preferred configuration of the linear drive according to the invention, the first axis and the second axis are arranged parallel to each another. In this configuration, the construction space of the linear drive is further minimized. In addition, the tensile force exerted by the shape memory alloy element and the restoring force exerted by the restoring element can be used effectively since there are no transverse force components with respect to one another.

In a particularly preferred configuration, the rod axis is arranged parallel to the first axis and parallel to the second axis. In this configuration, the construction space is further minimized. In addition, the tensile force exerted by the shape memory alloy element can be effectively converted into a movement of the rod element, since there are no transverse force components transversely with respect to the rod axis. As a result, there is increased efficiency in the conversion into the translatory movement of the rod element.

In a further configuration of the linear drive according to the invention, the bearing element is designed to block a movement of the rod element in the direction of the restoring force acting on the lever element. This configuration allows more freedom in the selection of the power values, since the rod element is blocked by the bearing element from moving back when changing from the second to the third state and then on to the fourth state.

In a further configuration, the bearing element has a first bearing on a first side with respect to the lever element and a second bearing on a second side opposite the first side with respect to the lever element. Since the bearing element has two bearings arranged on opposite sides of the lever element, the rod element can be guided better and the efficiency can be further increased as a result. In particular when the rod axis is arranged parallel to the first and second axis, there is a particularly high degree of efficiency for the conversion from the change in length of the shape memory alloy element into the translatory movement of the rod element.

According to a further configuration, the third power value and the fourth power value are equal to zero. In other words, in this configuration, application of electrical power to the shape memory alloy element is deactivated or terminated. This simplifies the activation of the shape memory alloy element.

According to a further configuration, the restoring element is designed as an additional shape memory alloy element which, when electrical power is applied, exerts an additional tensile force on the lever element, wherein said additional tensile force acts counter to the tensile force exerted by the shape memory alloy element connected to the first portion. In this configuration, the restoring element is, for example, not a commonly used spring, but rather an additional shape memory alloy element, such as a shape memory alloy wire. It is particularly advantageous that the additional tensile force of the shape memory alloy additional element acting as restoring force can easily be adapted to the prevailing conditions, in particular over a long service life of the linear drive, by means of appropriate activation.

According to a further configuration, the linear drive furthermore has an initial position contact which contacts the lever element, which is at least partially tilted back and displaced parallel in the direction of the restoring force, and thereby signals the fourth state. The initial position contact thus indicates the earliest possible point in time from which it is possible to change back from the fourth power value to the first power value. If the fourth power value is equal to zero, for example, i.e. no electrical power is applied to the shape memory alloy element, then the initial position contact signals the earliest possible point in time from which a first power value has to be applied again to the shape memory alloy element with electrical power if the four stated states are to be run through again in the next cycle.

In a particularly preferred configuration, the initial position contact contacts the lever element at an initial position contact portion of the lever element, which is arranged such that the initial position contact portion is arranged between the through bore and the second portion of the lever element. In this particularly preferred configuration, when the lever element comes into contact with the initial position contact, the lever element is tilted back into a predetermined initial position, for example into a horizontal initial position. As a result, an automatic "adjustment" of the lever element into the predetermined initial position takes place, so to speak, when a new, subsequent cycle starts.

According to a further configuration, the linear drive furthermore has an end position contact which contacts the tilted lever element, which is displaced parallel in the direction of the tensile force, and thereby signals the second state. The end position contact thus indicates the earliest possible point in time from which it is possible to change from the second power value to the third power value. If the third power value is equal to zero, for example, then the end position contact signals the earliest possible point in time from which application of electrical power to the shape memory alloy element is to be ended or deactivated.

In a particularly preferred configuration, the end position contact contacts the lever element at an end position contact portion of the lever element, which is arranged such that the first portion and the second portion of the lever element are arranged between the end position contact portion and the through bore. In this particularly preferred configuration, when the lever element comes into contact with the end position contact, the lever element returns at least partially by resting against the end position contact. As a result, release of the non-positive connection between the rod element and the lever element can be reliably initiated.

In a further configuration, the lever element in addition to the first portion and the second portion furthermore has a third portion and a fourth portion, wherein the first portion and the second portion of the lever element are arranged on a first side with respect to the rod element, the third portion and the fourth portion are arranged on a second side opposite the first side with respect to the rod element, and the fourth portion is arranged between the third portion and the through bore. The linear actuator also furthermore has the following components: a second shape memory alloy element which extends along a third axis and the length of which is adjustable by application of electrical power, wherein a first end of the second shape memory alloy element is connected to the third portion of the lever element, a second end of the second shape memory alloy element opposite the first end is stationarily connected to a third fixed bearing, and the second shape memory alloy element is designed to exert a second tensile force acting along the third axis on the lever element when electrical power is applied, wherein the second tensile force acts in the opposite direction to the tensile force exerted by the shape memory alloy element connected to the first portion; and a second restoring element extending along a fourth axis, wherein a first end of the second restoring element is connected to the fourth portion of the lever element, a second end of the second restoring element opposite the first end is stationarily connected to a fourth fixed bearing, and the second restoring element exerts a second restoring force which acts along the fourth axis and acts counter to the second tensile force exerted by the second shape memory alloy element. This configuration results in a reversal of the movement of the rod element when electrical power is applied to the second shape memory alloy element and without electrical power being applied to the shape memory alloy element connected to the first portion. This "point-symmetrical" arrangement of one shape memory alloy element and one restoring element on opposite sides of the rod element, with appropriate activation of the respective shape memory alloy elements, enables a simple reversal of the translatory movement of the rod element from a first direction to a second direction opposite to the first direction.

In an alternative configuration to the "point-symmetrical" configuration just described, the linear drive furthermore has the following components: a second shape memory alloy element which extends along the first axis and the length of which is adjustable by application of electrical power, wherein a first end of the second shape memory alloy element is connected to the first portion of the lever element, a second end of the second shape memory alloy element opposite the first end is stationarily connected to a third fixed bearing, and the second shape memory alloy element is designed to exert a second tensile force acting along the first axis on the lever element when electrical power is applied, wherein the second tensile force acts in the opposite direction to the tensile force exerted by the shape memory alloy element connected to the first portion; and a second restoring element extending along the second axis, wherein a first end of the second restoring element is connected to the second portion of the lever element, a second end of the second restoring element opposite the first end is stationarily connected to a fourth fixed bearing, and the second restoring element exerts a second restoring force which acts along the second axis and acts counter to the second tensile force exerted by the second shape memory alloy element. This alternative configuration also achieves a reversal of the movement of the rod element when electrical power is applied to the second shape memory alloy element and without electrical power being applied to the shape memory alloy element connected to the first portion. In contrast to the "point-symmetrical" arrangement just described, however, in this alternative configuration the two pairs of one shape memory alloy element and one restoring element are located on the same side of the rod element, but on opposite sides of the lever element, such that the lever element can be tilted in both directions by means of the respective shape memory alloy element.

In a particularly preferred configuration of the alternative configuration, the first restoring element is an additional shape memory alloy element which, when electrical power is applied, exerts an additional tensile force on the lever element, which acts counter to the tensile force exerted by the shape memory alloy element connected to the first portion. Furthermore, the second restoring element is a second shape memory alloy additional element which, when electrical power is applied, exerts a second additional tensile force on the lever element, which acts counter to the second tensile force exerted by the second shape memory alloy element connected to the first portion. Accordingly, this particularly preferred configuration does not use springs as restoring elements, but rather additional shape memory alloy elements. In this particularly preferred configuration, the two shape memory alloy elements arranged opposite each other exert an oppositely directed tensile force on the lever element in order to tilt the lever element in the respective direction, and the two additional shape memory alloy elements, which are also arranged opposite each another and are also each on the respectively opposite side of the respective shape memory alloy element, generate the respective restoring force for the respective shape memory alloy element by means of their respective additional tensile force.

In accordance with a second aspect of the present invention, a linear drive arrangement is provided. The linear drive arrangement according to the invention comprises a linear drive according to the first aspect or configurations thereof, and at least one second linear drive according to the first aspect or configurations thereof arranged spaced apart from the linear drive according to the first aspect or configurations thereof, wherein the rod elements of the at least two linear drives are designed as a common single rod element. With this arrangement or cascading of the linear drives, an increase in tensile force can be achieved with appropriate activation of the respective shape memory element, since a plurality of shape memory alloy elements pull in the same direction of the lever element.

In a particularly preferred configuration of the linear drive arrangement, the linear drive arrangement also has an activation unit which is designed to activate the at least two linear drives according to the first aspect or configurations thereof in such a way that only one of the at least two linear drives changes from the first state in the direction of the second state. In this particularly preferred configuration, an increasingly more uniform and continuous movement of the rod element is achieved with an increasing number of linear drives according to the first aspect or configurations thereof. In addition, if linear drives that allow reversal of the movement of the rod element are cascaded, an increasingly more uniform and continuous movement of the rod element in opposite directions can also be achieved.

Further features and objects of the present invention will become apparent to a person skilled in the art by putting the present teaching into practice and taking into consideration the accompanying drawings, in which.

Elements of identical design or function are provided with the same reference signs across all figures.

Figure 1:
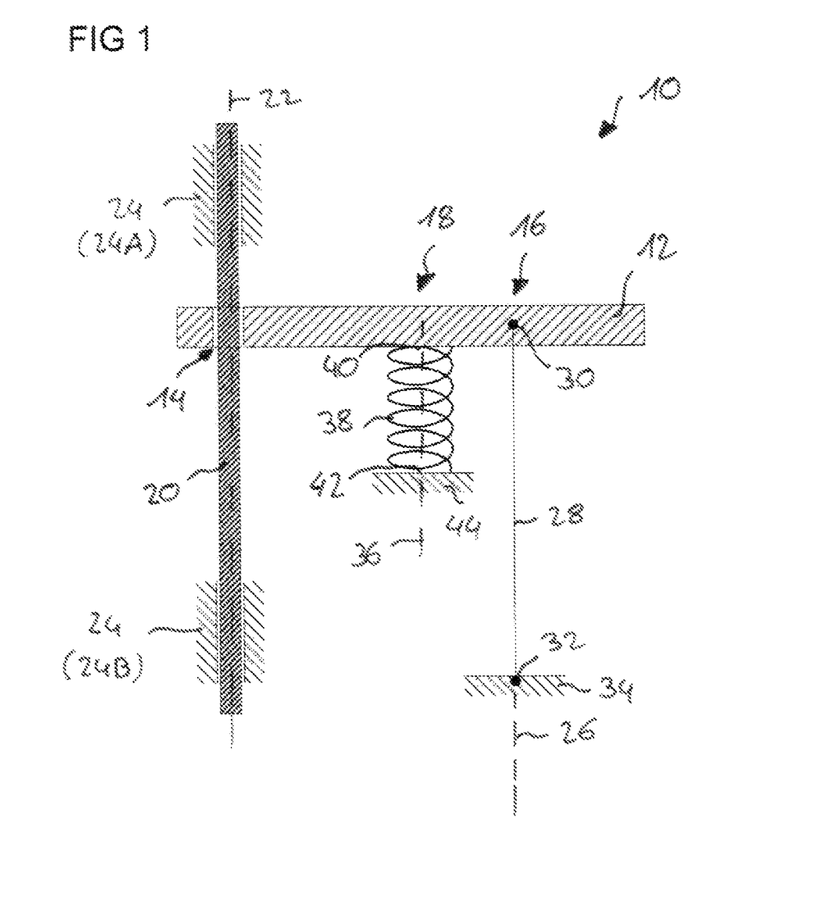
FIG. 1 shows a schematic view of an embodiment of a linear drive according to the invention.

Reference is made firstly to FIG. 1, which shows a schematic view of an embodiment of a linear drive 10 according to the invention. The linear drive 10 can be used for positioning tasks, for valves, for adjusting optical systems or in other applications.

The linear drive 10 comprises a lever element 12 which has a through bore 14, a first portion 16 spaced from the through bore 14 and a second portion 18 spaced from the first portion 16 and the through bore 14. The second portion 18 is arranged between the through bore 14 and the first portion 16.

The linear drive 10 furthermore comprises a rod element 20 which extends along a rod axis 22 and through the through bore 14.

The linear drive 10 furthermore comprises a bearing element 24. The bearing element 24 supports the rod element 20 in such a way that a movement of the rod element 20 is possible only along the rod axis 22 and a movement perpendicular to the rod axis 22 is blocked. In the specific case of FIG. 1, the bearing element 24 has a first bearing 24A and a second bearing 24B. The first bearing 24A is also located on a first side of the lever member 12 and the second bearing 24B is located on a second side of the lever element 12 opposite the first side. In other words, the two bearings 24A and 24B are located on opposite sides with respect to the lever member 12.

The linear drive 10 furthermore comprises a shape memory alloy element 28 extending along a first axis 26. In the specific example of FIG. 1, the shape memory alloy element 28 is designed as a shape memory alloy wire. By applying electrical power to the shape memory alloy element 28, the length thereof can be adjusted. The application of electrical power to the shape memory alloy element 28 causes the shape memory alloy element 28 to heat up and, as a result, shortening of the shape memory alloy element 28 takes place, as is known to the person skilled in the art for such elements. In this case, an increasing shortening of the shape memory alloy element 28 can take place when electrical power with an increasing electrical power value is applied. However, an increasing shortening of the shape memory alloy element 28 can also take place when electrical power with a constant electrical power value is applied, because over a longer period of time the energy input into the shape memory alloy element 28 increases even in the event of a constant power value, as a result of which said shape memory alloy element is increasingly shortened further.

A first end 30 of the shape memory alloy element 28 is connected to the first portion 16 of the lever element 12. A second end 32 of the shape memory alloy element 28 opposite the first end 30 is stationarily connected to a fixed bearing 34.

The shape memory alloy element 28 is designed in such a way that, when electrical power is applied to it, it exerts a tensile force acting along the first axis 26 on the lever element 12. The tensile force occurs by shortening of the length of the shape memory alloy element 28 when electrical power is applied.

The linear drive 10 furthermore comprises a restoring element 38 extending along a second axis 36. In the specific example of FIG. 1, the restoring element 38 is designed as a spring element. A first end 40 of the restoring element 38 is connected to the second portion 18 of the lever element 12 and a second end 42 of the restoring element 38 opposite the first end 40 is stationarily connected to a second fixed bearing 44.

The restoring element 38 is configured in such a way that it exerts a restoring force acting on the lever element 12 along the second axis 36 and counter to the tensile force exerted by the shape memory alloy element 28.

In the specific example of FIG. 1, when electrical power is applied to the shape memory alloy element 28, the tensile force would act downward and the restoring force of the restoring element 38 would act upward in the opposite direction.

As is furthermore shown in FIG. 1, in the specific example of FIG. 1 the rod axis 22, the first axis 26 and the second axis 36 are all arranged parallel to one another. In other embodiments which are not shown, this need not be the case.

By appropriately activating the shape memory alloy element 28, it is now possible to move the rod element 20 along the rod axis 22, as is described in more detail in conjunction with FIGS. 2 to 5. The movement of the rod element 20 along the rod axis 22 can then be used for the applications described at the beginning, such as, for example, for positioning tasks or the like. For this purpose, the linear drive 10 has four prominent states, which will now be explained below in conjunction with FIGS. 2 to 5.

Figure 2:
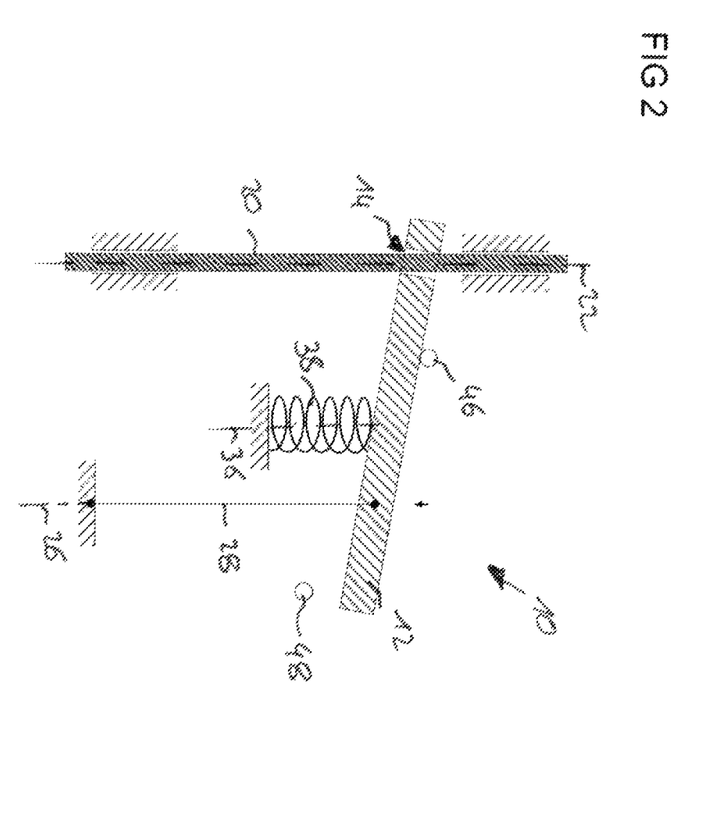
FIG. 2 shows a schematic view of an embodiment of a linear drive according to the invention in a first state.

Reference will be made firstly to FIG. 2, which shows the linear drive 10 in a first state.

In the first state, electrical power with a first power value is applied to the shape memory alloy element 28. The application of a first power value to the shape memory alloy element 28 results in the shape memory alloy element 28 being shortened such that the lever element 12 tilts because of the tensile force exerted by the shape memory alloy element 28. In the specific example of FIG. 2, the tensile force acts downward such that the lever element 12 tilts clockwise. The tilting of the lever element 12 takes place about an axis of rotation which is arranged substantially perpendicularly to the second axis 36 and intersects the latter.

Tilting the lever element 12 in a clockwise direction creates a non-positive connection between the lever element 12 and the rod element 20. The first power value for electrically applying to the shape memory alloy element 28 is adapted to a diameter of the rod element 12 and to a diameter of the through bore 14 in such a way that, because of the shortening of the shape memory alloy element 28, tilting of the lever element 12 by a predetermined angle leads to a non-positive connection between the lever element 12 and the rod element 20. The non-positive connection is distinguished in that forces can be transmitted between the lever element 12 and the rod element 20 without the lever element 12 being able to move in the direction of the rod axis 22 relative to the rod element 20.

The non-positive connection will be explained in more detail in conjunction with FIG. 6.

As is also shown in FIG. 2, the linear drive 10 furthermore has two position contacts. A first position contact is an initial position contact 46. A second position contact is an end position contact 48. The position contacts 46, 48 are used to signal the respective states of the linear drive 10, as will be explained later in more detail.

Figure 3:
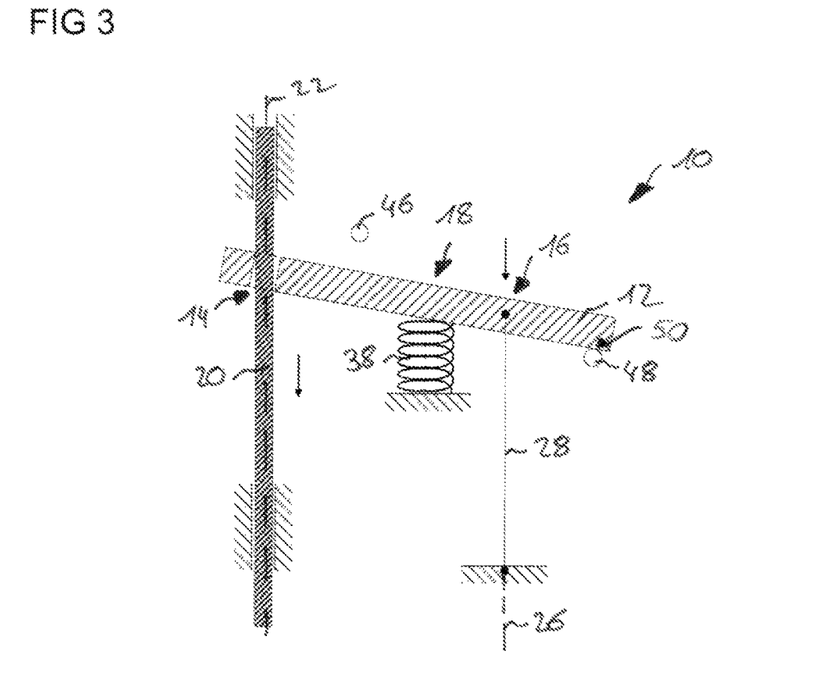
FIG. 3 shows a schematic view of an embodiment of a linear drive according to the invention in a second state.

Reference will now be made to FIG. 3, which shows the linear drive 10 in a second state following the first state (FIG. 2).

In the second state, electrical power with a second power value, which is greater than or equal to the first power value, is applied to the shape memory alloy element 28. By application of the second power value to the shape memory alloy element 28, the shape memory alloy element 28 is shortened further. The further shortening occurs, for example, when the second power value is equal to the first power value, but because of a longer period of time for which electrical power is applied to the shape memory alloy element 28, the amount of energy introduced into the shape memory alloy element 28 overall is increased and, as a result, further conversion processes take place in the shape memory alloy element 28. Alternatively or additionally, the shape memory alloy element 28 can also be further shortened by the second power value being greater than the first power value. However, this is not absolutely necessary.

As can be seen by comparing FIG. 3 with FIG. 2, in the second state the already tilted lever element 12 is displaced parallel along the first axis 26 in the direction of the tensile force exerted by the shape memory alloy element 28. Since the tilting of lever element 12 results in a non-positive connection between the rod element 20 and the lever element 12, a parallel displacement of the tilted lever element 12 leads to an associated movement of the rod element 20 along the rod axis 22 and in the direction of the tensile force exerted on the lever element 12 by the shape memory alloy element 28.

As can furthermore be seen in FIG. 3, the end position contact 48 contacts the tilted lever element 12, which is displaced parallel in the direction of the tensile force, and thereby signals that the second state has been reached. The end position contact 48 indicates the earliest possible point in time from which it is possible to change from the second power value to a third power value, explained in conjunction with FIG. 4, for applying electrical power to the shape memory alloy element 28.

The end position contact 48 contacts the lever element 12 at an end position contact portion 50, which is arranged such that the first portion 16, to which the shape memory alloy element 28 is fastened, and the second portion 18, to which the restoring element 38 is fastened, are arranged between the through bore 14 and the end position contact portion 50. The advantage of this arrangement is that now, owing to the contact of the lever element 12 with the end position contact 48, an at least partial tilting back of the lever element 12, in the present case directed counterclockwise, is initiated, specifically about an axis of rotation which is arranged in the region of the end position contact portion 50 or in the region of the end position contact 48.

As can also be seen in FIG. 3, the lever element 12 has no contact with the initial position contact 46 in the second state.

Figure 4:
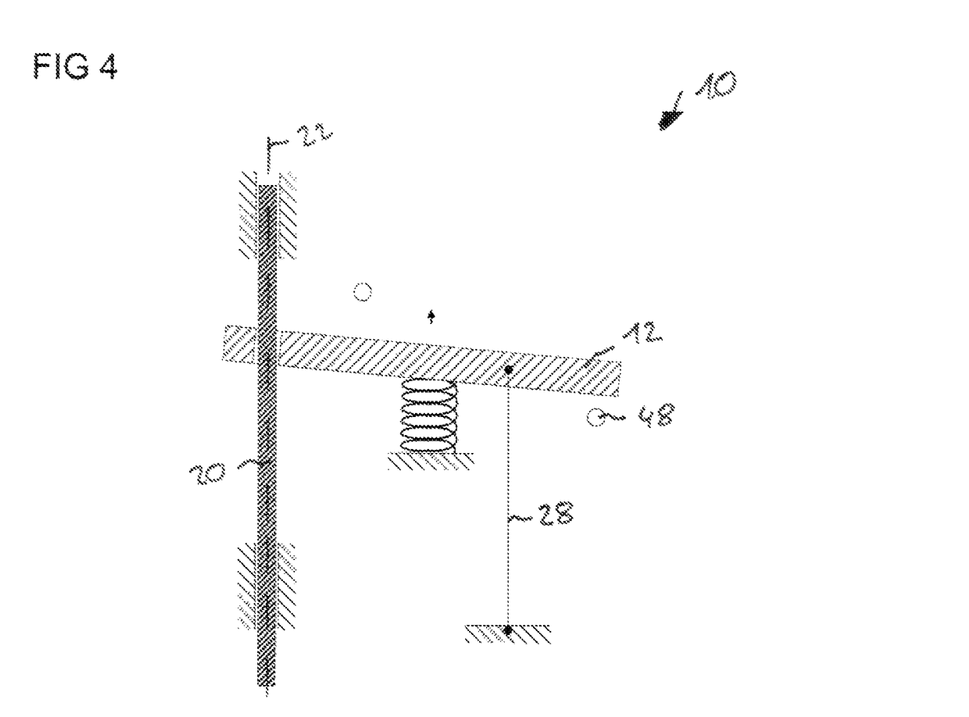
FIG. 4 shows a schematic view of an embodiment of a linear drive according to the invention in a third state.

Reference will now be made to FIG. 4, which shows the linear drive 10 in a third state following the second state (FIG. 3).

In the third state, electrical power with a third power value, which is smaller than the first power value, is applied to the shape memory alloy element 28. The third power value can be, for example, a power value of zero, which means that electrical power is no longer applied to the shape memory alloy element 28. Of course, however, a third power value that is lower than the first power value can also be selected, wherein, in such a case, electrical power would continue to be applied to the shape memory alloy element 28, but with a third power value that is lower than the first power value.

In the third state, the shape memory alloy element 28 is at least partially lengthened again. In the present case, the lever element 12 is thus at least partially tilted back counterclockwise. This at least partial tilting back of the lever element 12 can be initiated by the already mentioned contact between the lever element 12 and the end position contact 48. The result is that, because of the at least partial tilting back of the lever element 12, the non-positive connection between the lever element 12 and the rod element 20 is released. This enables a relative movement of the lever element 12 relative to the rod element 20 along the rod axis 22.

Figure 5:
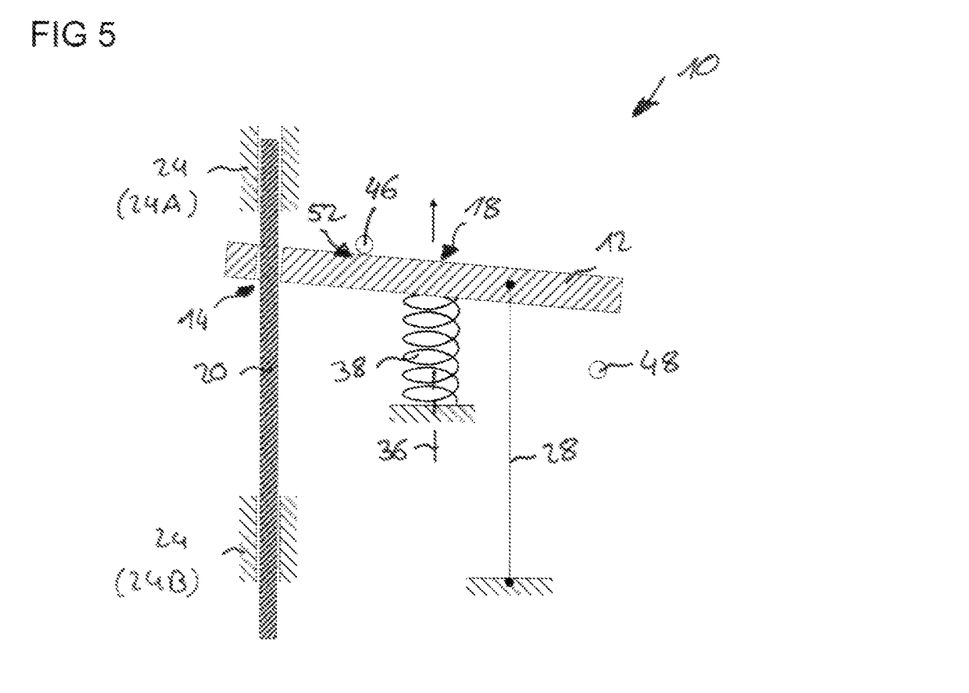
FIG. 5 shows a schematic view of an embodiment of a linear drive according to the invention in a fourth state.

Reference will now be made to FIG. 5, which shows the linear drive 10 in a fourth state following the third state (FIG. 4).

In the fourth state, electrical power with a fourth power value, which is smaller than or equal to the third power value, is applied to the shape memory alloy element 28. For example, the fourth power value can again be a power value of zero, which means that electrical power is still not applied to the shape memory alloy element 28.

In the fourth state, the at least partially tilted back lever element 12 is displaced parallel along the second axis 36 in the direction of the restoring force exerted by the restoring element 38 on the lever element 12. Since there is no non-positive connection between the lever element 12 and the rod element 20, there is no movement (back) of the rod element 20 in the direction of the restoring force exerted by the restoring element 38. In an example which is not illustrated, the bearing element 24 or the two bearings 24A and 24B can be designed in such a way that a movement of the rod element 20 in the direction of the restoring force acting on the lever element 12 is blocked.

As is also shown in FIG. 5, in the fourth state there is no contact between the lever element 12 and the end position contact 48. However, the at least partially tilted-back lever element 12 makes contact with the initial position contact 46. The initial position contact 46 signals the fourth state and indicates the earliest possible point in time from which it is possible to change from the fourth power value to the first power value and thereby start a new cycle.

As shown in FIG. 5, the initial position contact 46 contacts the lever element 12 at an initial position contact portion 52 of the lever element 12, which is arranged in such a way that the initial position contact portion 52 is arranged between the through bore 14 and the second portion 18 of the lever element 12. This arrangement has the advantage that, when the lever element 12 comes into contact with the initial position contact 46, the lever element 12 is tilted back into a predetermined initial position, specifically about an axis of rotation which is arranged in the region of the initial position contact portion 52 or in the region of the initial position contact 46. The initial position produced using the initial position contact 46 can be, for example, a horizontal position of the lever element 12, as shown in FIG. 1, and contributes to the "adjustment" of the lever element 12 for the new, subsequent cycle.

Figure 6:
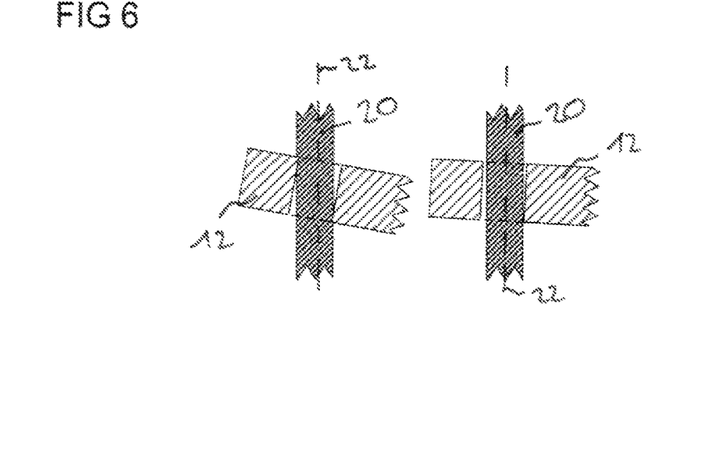
FIG. 6 shows a detailed view which illustrates a non-positive connection between the lever element and the rod element.

Reference will now be made to FIG. 6, which shows a detailed view to clarify the non-positive connection between the lever element 12 and the rod element 20 mentioned in conjunction with FIGS. 2 to 5.

The left-hand image in FIG. 6 shows the non-positive connection between the lever element 12 and the rod element 20. In the right-hand image of FIG. 6, on the other hand, the non-positive connection between the lever element 12 and the rod element 20 is released. In the right-hand image of FIG. 6, a movement of the lever element 12 relative to the rod element 20 along the rod axis 22 is therefore possible. However, precisely this relative movement of the lever element 12 along the rod axis 22 is prevented in the non-positive connection between the lever element 12 and the rod element 20 (left-hand image of FIG. 6).

Figure 7:
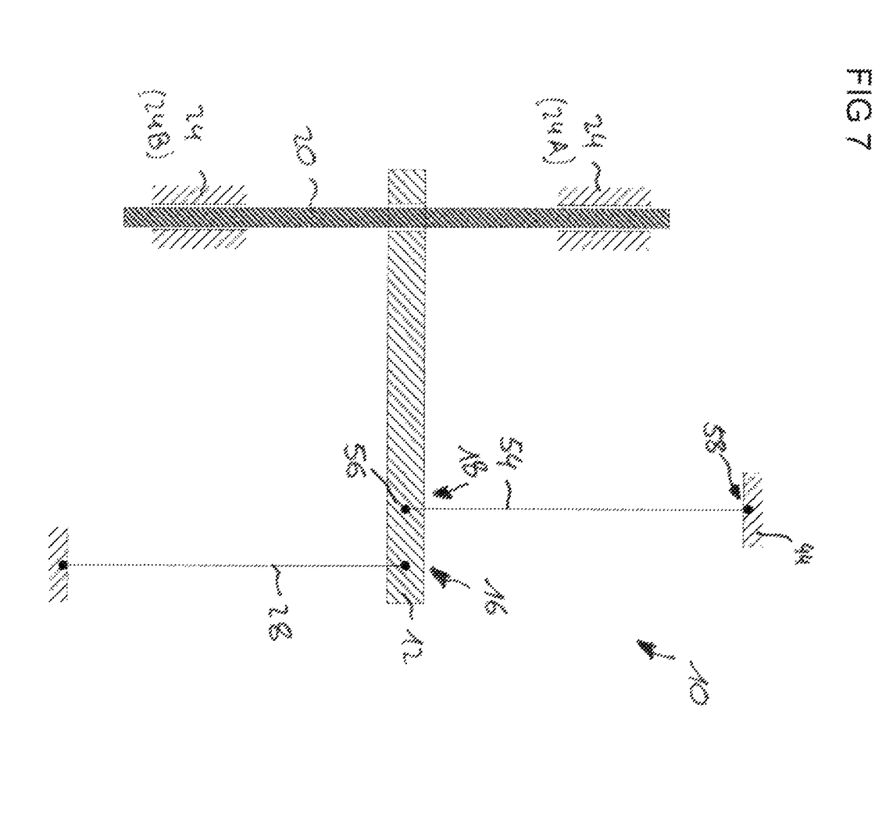
FIG. 7 shows a schematic view of another embodiment of a linear drive according to the invention.

Reference will now be made to FIG. 7, which shows another embodiment of a linear drive 10 according to the invention.

The linear drive 10 has in turn the shape memory alloy element 28, the lever element 12, the rod element 20 and the bearing element 24 or the two bearings 24A and 24B. In the specific example of FIG. 7, however, the restoring element 38 is designed as an additional shape memory alloy element 54, which exerts an additional tensile force on the lever element 12 when electrical power is applied. For this purpose, a first end 56 of the additional shape memory alloy element 54 is fastened to the second portion 18 and a second end 58 of the additional shape memory alloy element 54 opposite the first end 56 is connected to the second fixed bearing 44, which now, owing to the additional tensile force exerted by the additional shape memory element 54, is arranged on the opposite side compared to FIGS. 1 to 5.

Figure 8:
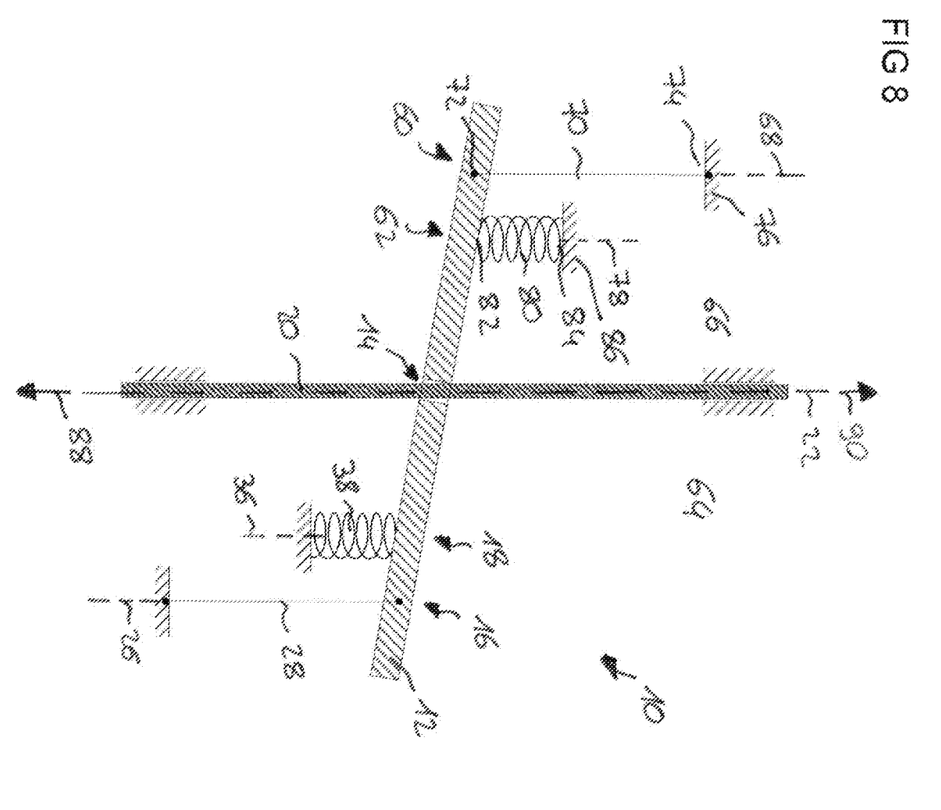
FIG. 8 shows a schematic view of another embodiment of a linear drive according to the invention.

Reference will now be made to FIG. 8, which shows a further embodiment of the linear drive 10. With the embodiment of the linear drive 10 shown in FIG. 8, it is possible to move the rod element 20 in two directions.

For this purpose, the lever element 12 of the linear drive 10 comprises, in addition to the first portion 16 and the second portion 18, a third portion 60 and a fourth portion 62. The first portion 16 and the second portion 18 are in this case arranged on a first side 64 of the rod element 20. The third portion 60 and the fourth portion 62 are arranged on a second side 66 of the rod element 20 opposite the first side 64. In addition, the fourth portion 62 is arranged between the third portion 60 and the through bore 14.

In the embodiment of FIG. 8, the linear drive 10 in turn has the shape memory alloy element 28, which extends along the first axis 26, and also the restoring element 38, which extends along the second axis 36.

The linear drive 10 according to the embodiment of FIG. 8 also has a second shape memory alloy element 70 which extends along a third axis 68 and the length of which is adjustable by applying electrical power. A first end 72 of the second shape memory alloy element 70 is connected to the third portion 60. A second end 74 of the second shape memory alloy element 70 opposite the first end 72 is stationarily connected to a third fixed bearing 76. The second shape memory alloy element 70 serves to exert a second tensile force acting along the third axis 68 on the lever element 12 when electrical power is applied. The second tensile force acts in the opposite direction to the tensile force exerted by the shape memory alloy element 28 connected to the first portion 16. The shape memory alloy element 28 connected to the first portion 16 may thus also be referred to as a "first" shape memory alloy element 28, since the shape memory alloy element 70 is the "second" shape memory alloy element of the linear drive 10.

In addition to the additional second shape memory alloy element 70, the linear drive 10 according to the embodiment of FIG. 8 also has a second restoring element 80 extending along a fourth axis 78. A first end 82 of the second restoring element 80 is connected to the fourth portion 62 and a second end 84 of the second restoring element 80 opposite the first end 82 is stationarily connected to a fourth fixed bearing 86. The second restoring element 80 exerts a second restoring force acting along the fourth axis 78 on the lever element 12, the second restoring force acting counter to the second tensile force exerted by the second shape memory alloy element 70. The linear drive 10 according to the embodiment of FIG. 8 thus has two pairs, each with a shape memory alloy element and a restoring element, which are arranged on opposite sides with respect to the rod element 20. Thus, a first pair consisting of the shape memory alloy element 28 and the restoring element 38 is arranged on the first side 64 and a second pair consisting of the second shape memory alloy element 70 and the second restoring element 80 is arranged on the second side 66.

If electrical power corresponding to the four power values already discussed in conjunction with FIGS. 1 to 5 is then applied to the first shape memory alloy element 28, and if at the same time electrical power is not applied to the second shape memory alloy element 70, then the rod element moves along the rod axis 22 in a first direction 88. If, on the other hand, electrical power is not applied to the first shape memory alloy element 28, but electrical power corresponding to the four power values discussed in conjunction with FIGS. 1 to 5 is applied to the second shape memory alloy element 70, the rod element 20 moves along the rod axis 22 in a second direction 90 opposite to the first direction 88. The rod element 20 can thus be moved either in the first direction 88 or in the second direction 90 by appropriately applying electrical power to the first or second shape memory alloy element 28, 70. Thus, a reversal of the movement of the rod element 20 can be realized by means of the linear drive 10 according to the embodiment of FIG. 8.

Figure 9:
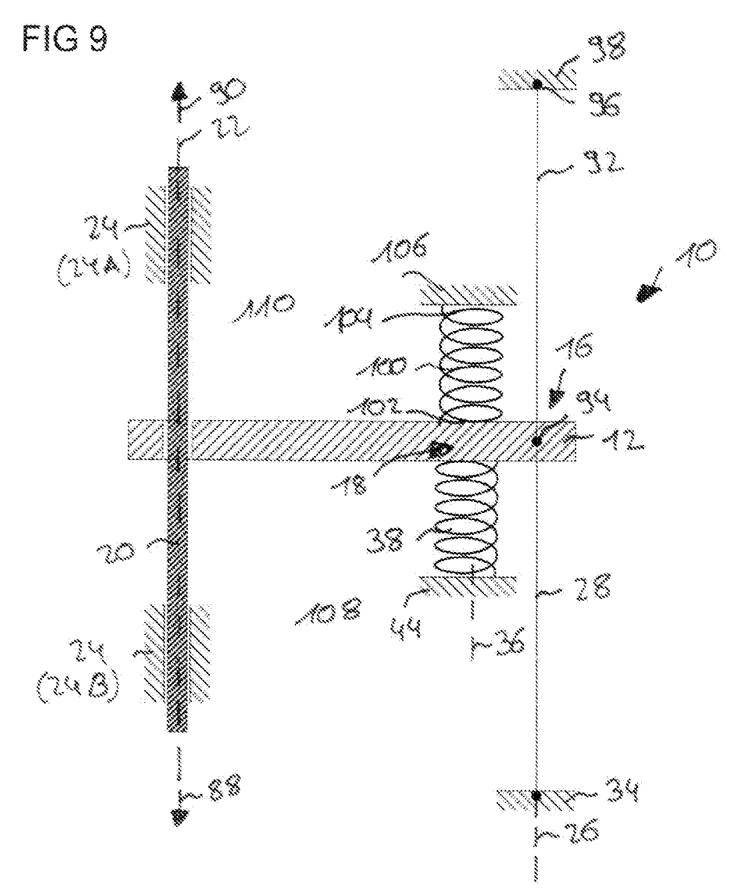
FIG. 9 shows a schematic view of another embodiment of a linear drive according to the invention.

Reference will now made to FIG. 9, which shows a schematic view of another embodiment of the linear drive 10. The embodiment according to FIG. 9 is an alternative embodiment to the embodiment of FIG. 8. It is also possible with the embodiment of the linear drive 10 shown in FIG. 9 to move the rod element 20 both in one direction and in the other direction.

The linear drive 10 according to the embodiment of FIG. 9 in turn comprises the lever element 12, the shape memory alloy element 28 extending along the first axis 26 with the first fixed bearing 36, the restoring element 38 extending along the second axis 36 with the second fixed bearing 44 and the rod element 20 supported by means of the bearing element 24 or by means of the bearings 24A and 24B.

The linear drive 10 according to the embodiment of FIG. 9 furthermore comprises a second shape memory alloy element 92 which extends along the first axis 26 and the length of which is adjustable by applying electrical power. A first end 94 of the second shape memory alloy element 92 is connected here to the first portion 16 of the lever element 12. A second end 96 of the second shape memory alloy element 92 opposite the first end 94 is stationarily connected to a third fixed bearing 98. The second shape memory alloy element 92 exerts a second tensile force acting along the first axis 26 on the lever element 12 when electrical power is applied, the second tensile force acting in the opposite direction to the tensile force exerted by the shape memory alloy element 28 connected to the first portion 16. In other words, the second shape memory alloy element 92 exerts a tensile force which acts counter to the tensile force exerted by the shape memory alloy element 28. However, both shape memory alloy elements 28, 92 are arranged on the first portion 16 of the lever element 12, but on opposite sides with respect to the lever element 12.

The linear drive 10 according to the embodiment of FIG. 9 furthermore comprises a second restoring element 100 extending along the second axis 36. A first end 102 of the second restoring element 100 is connected to the second portion 18 of the lever element 12. A second end 104 of the second restoring element 100 opposite the first end 102 is stationarily connected to a fourth fixed bearing 106. The second restoring element 100 exerts a second restoring force acting along the second axis 36, the second restoring force acting counter to the second tensile force exerted by the second shape memory alloy element 92. The second restoring element 100 accordingly exerts a restoring force which acts counter to the restoring force exerted by the restoring element 38. Both restoring elements 38, 100 are arranged on the second portion 16 of the lever element 12, but on opposite sides with respect to the lever element 12.

The linear drive 10 according to the embodiment of FIG. 9 thus in turn has two pairs of in each case one shape memory alloy element and one restoring element. However, the two pairs are located on the same side with respect to the rod element 20, but on opposite sides with respect to the lever element 12. Thus, a first pair consisting of the shape memory alloy member 28 and the restoring element 38 is arranged on a first side 108 of the lever element 12 and a second pair consisting of the second shape memory alloy element 92 and the second restoring element 100 is arranged on a second side 110 of the lever element 12 opposite the first side 108.

If electrical power corresponding to the four power values already discussed in conjunction with FIGS. 1 to 5 is then applied to the first shape memory alloy element 28, and if at the same time electrical power is not applied to the second shape memory alloy element 92, then the rod element moves along the rod axis 22 in the first direction 88. If, on the other hand, electrical power is not applied to the first shape memory alloy element 28, but electrical power corresponding to the four power values discussed in conjunction with FIGS. 1 to 5 is applied to the second shape memory alloy element 92, the rod element 20 moves along the rod axis 22 in the second direction 90. The rod element 20 can thus be moved either in the first direction 88 or in the second direction 90 by appropriately applying electrical power to the first or second shape memory alloy element 28, 92. Thus, the linear drive 10 according to the embodiment of FIG. 9 can also enable the movement of the rod element 20 to be reversed.

Figure 10:
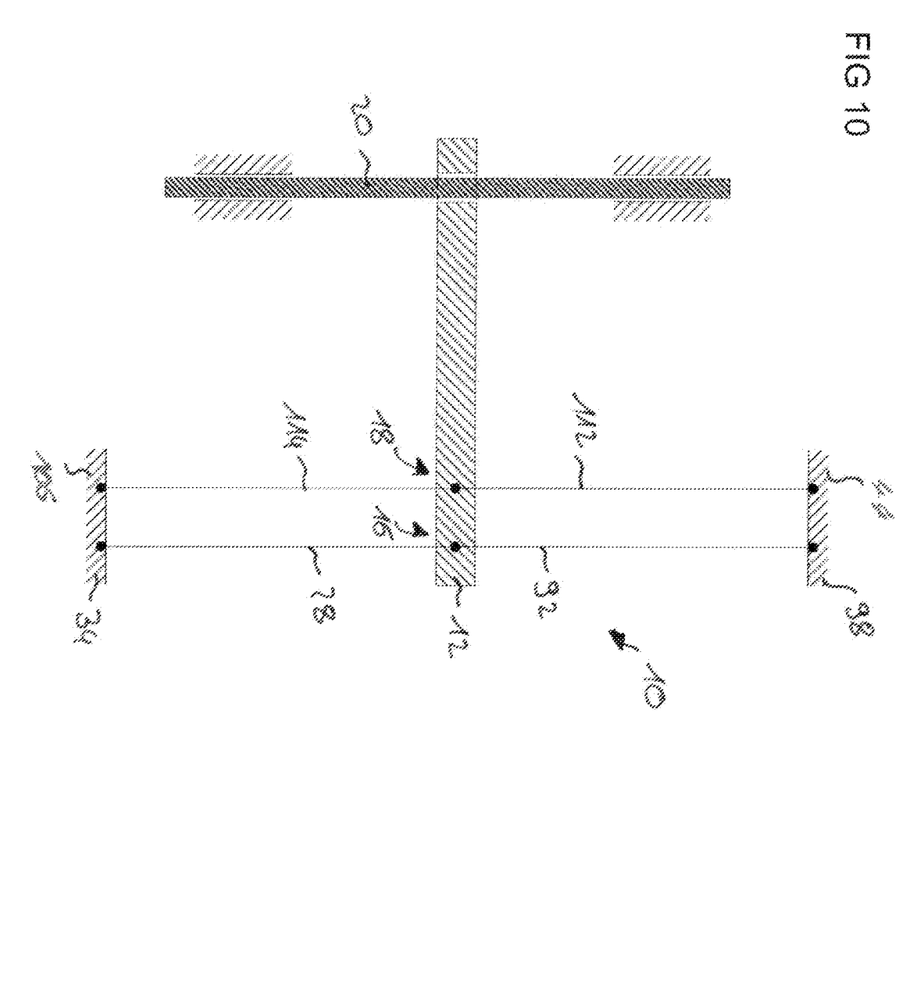
FIG. 10 shows a schematic view of another embodiment of a linear drive according to the invention.

Reference will now be made to FIG. 10, which shows a further embodiment of the linear drive 10. The embodiment of FIG. 10 is based on the linear drive 10 according to the embodiment of FIG. 9.

The linear drive 10 according to the embodiment of FIG. 10 has the shape memory alloy element 28 with the first fixed bearing 34 and the second shape memory alloy element 92 arranged opposite the latter with the third fixed bearing 98, and also the lever element 12 and the rod element 20 supported by means of the bearing element 24 or by means of the bearings 24A and 24B.

In contrast to the linear drive 10 according to the embodiment of FIG. 9, the first restoring element 38 and the second restoring element 100 are not designed in the form of springs in the linear drive 10 according to the embodiment of FIG. 10. Instead, the first restoring element 38 is designed as a first additional shape memory alloy element 112, which exerts a first additional tensile force on the lever element 12 when electrical power is applied. This first additional tensile force acts counter to the first tensile force exerted by the shape memory alloy element 28 connected to the first portion 16. Furthermore, the second restoring element 100 is designed as a second additional shape memory alloy element 114, which exerts a second additional tensile force on the lever element 12 when electrical power is applied. This second additional tensile force acts counter to the second tensile force exerted by the second shape memory alloy element 92 connected to the first portion 16. A respective first end of the first and second additional shape memory alloy element 112, 114 is connected to the second portion 18 of the lever element 12 and a respective opposite second end of the first and second shape memory alloy member 112, 114 is stationarily connected to a fixed bearing. The first fixed bearing 34 and the fourth fixed bearing 106 can be combined here to form a common fixed bearing, as indicated in FIG. 10. Analogously, the third fixed bearing 98 and the second fixed bearing 44 can be combined to form a common fixed bearing, as also indicated in FIG. 10.

Reference will now made to FIGS. 11 to 14, which show a linear drive arrangement 1000 which is produced by combining a plurality of linear drives. In the specific example of FIGS. 11 to 14, the linear drive arrangement 1000 has a first linear drive 10 and a further, second linear drive 10, which are arranged adjacent to one another. The rod elements of the respective linear drives are designed here as a common rod element 1002. The parallel arrangement of two linear drives 10 increases the tensile force exerted on the common rod element 1002.

The linear drive arrangement 1000 furthermore comprises an activation unit 1004, which is connected to the respective shape memory alloy element of the respective linear drive 10 and can apply electrical power to said element corresponding to the four power values described in conjunction with FIGS. 1 to 5. The activation unit 1004 acts on the respective shape memory alloy element of the respective linear drive 10 in such a way that only in each case one of the two linear drives 10 changes from the first state toward the second state. This creates a smoother and more continuous movement of the common rod element 1002. Of course, in other embodiments that are not shown, the linear drive arrangement 1000 can have more than the two linear drives 10 shown.

Figure 11:
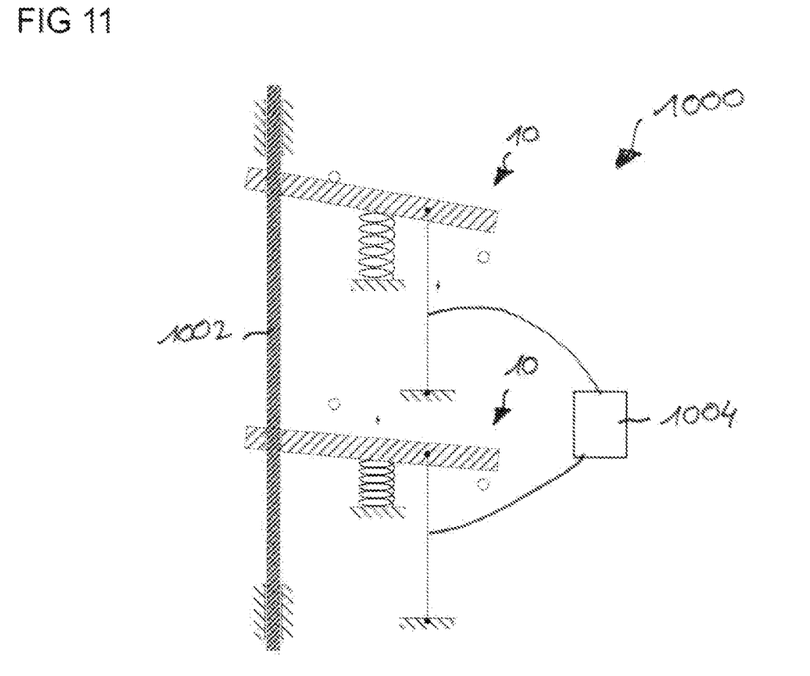
FIG. 11 shows a schematic view of an embodiment of a linear drive arrangement with two linear drives, one linear drive being shown in the first state and the other linear drive in the third state.
Figure 12:
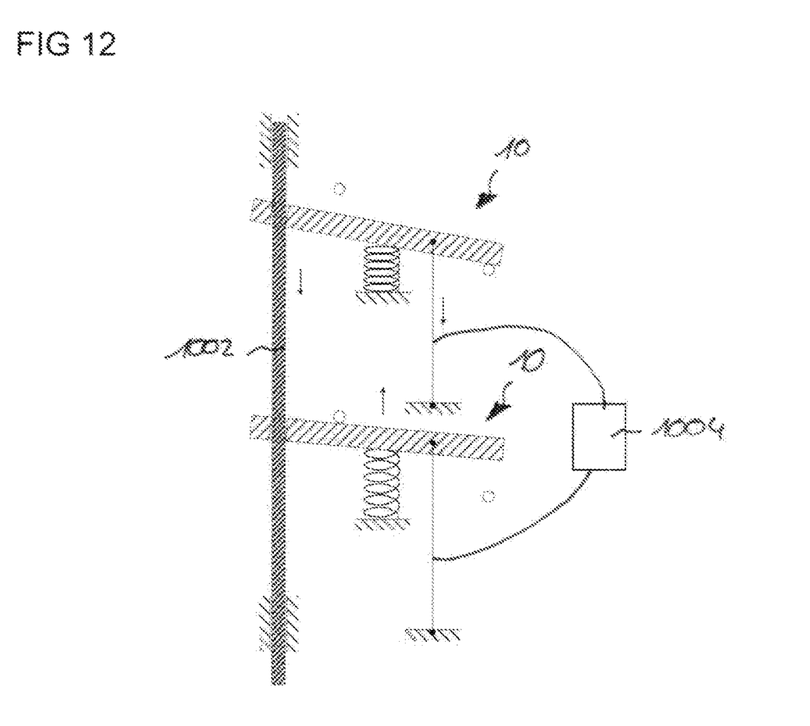
FIG. 12 shows a schematic view of an embodiment of a linear drive arrangement with two linear drives, one linear drive being shown in the second state and the other linear drive in the fourth state.
Figure 13:
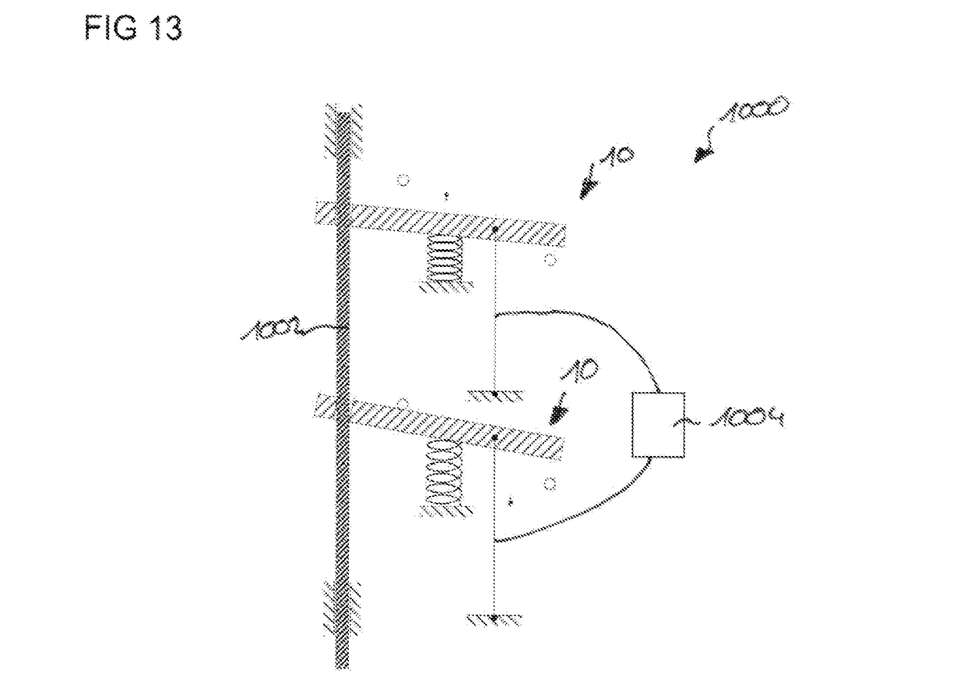
FIG. 13 shows a schematic view of an embodiment of a linear drive arrangement with two linear drives, one linear drive being shown in the third state and the other linear drive being shown in the first state.
Figure 14:
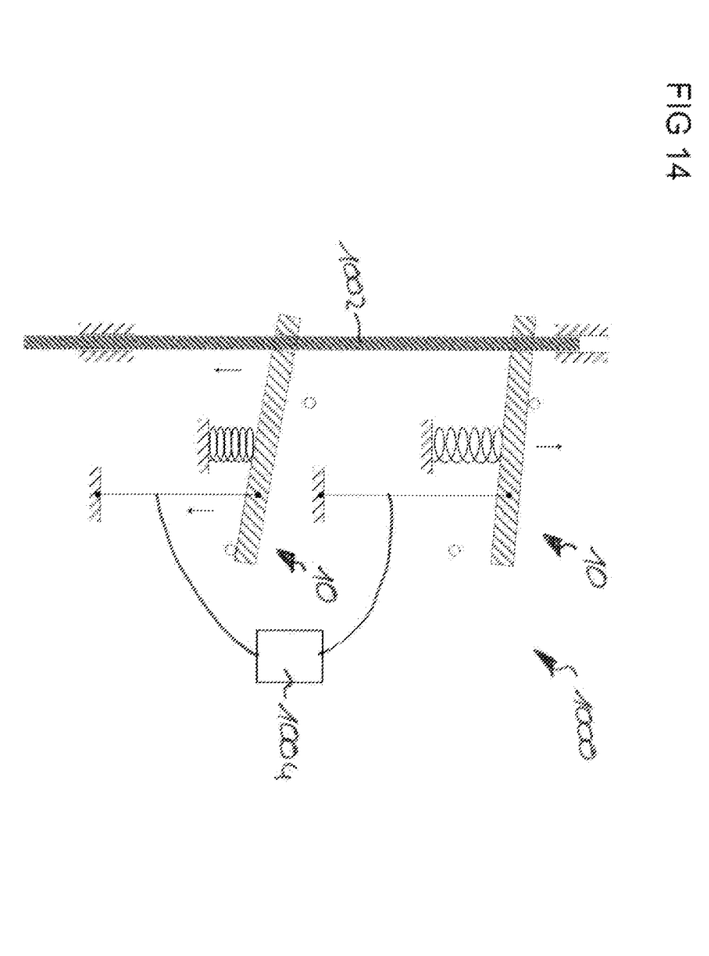
FIG. 14 shows a schematic view of an embodiment of a linear drive arrangement with two linear drives, one linear drive being shown in the fourth state and the other linear drive in the second state.

To clarify the activation of the linear drives 10 in the linear drive arrangement 1000, the respective states of the respective linear drives 10 are illustrated in FIGS. 11 to 14. In FIG. 11, one of the two linear drives 10, specifically the upper of the two linear drives 10, is in the first state and the other of the two linear drives 10, specifically the lower of the two linear drives 10, is in the third state. In FIG. 12 the upper of the two linear drives is in the second state and the lower of the two linear drives is in the fourth state. In FIG. 13, the upper of the two linear drives 10 is in the third state and the lower of the two linear drives 10 is in the first state. Finally, in FIG. 14, the upper of the two linear drives 10 is in the fourth state and the lower of the two linear drives 10 is in the second state. The activation unit 1004 ensures that in each case only one of the two linear drives 10 changes from the first state in the direction of the second state. If there are more than the two linear drives 10 shown, the activation unit 1004 controls the respective states of the respective linear drives 10 accordingly such that, in turn, only one of the plurality of linear drives 10 in each case changes from the first state in the direction of the second state.

With the embodiments of the linear drive 10 described in conjunction with FIGS. 1 to 10 and with the linear drive arrangement 1000 described in conjunction with FIGS. 11 to 14, a translatory movement of the rod element 20 along the rod axis 22 can be realized by means of shape memory alloy elements.

The invention claimed is:
1. A linear drive, comprising:
a lever element which has a through bore, a first portion spaced apart from the through bore and a second portion arranged between the first portion and the through bore,
a rod element which extends along a rod axis and through the through bore,
a bearing element which supports the rod element, the bearing element configured to allow a movement of the rod element along the rod axis and to block a movement perpendicular to the rod axis,
a shape memory alloy element which extends along a first axis and length of which is adjustable by application of electrical power, wherein
a first end of the shape memory alloy element is connected to the first portion of the lever element, a second end of the shape memory alloy element opposite the first end is stationarily connected to a first fixed bearing, and the shape memory alloy element is configured to exert a tensile force acting along the first axis on the lever element when electrical power is applied, a restoring element extending along a second axis, wherein a first end of the restoring element is connected to the second portion of the lever element, a second end of the restoring element opposite the first end is stationarily connected to a second fixed bearing, and the restoring element exerts a restoring force on the lever element acting along the second axis and counter to the tensile force, wherein in a first state, in which electrical power with a first power value is applied to the shape memory alloy element, the shape memory alloy element is shortened in such a way that the lever element is tilted owing to the tensile force exerted by the shape memory alloy element and, as a result, there is a non-positive connection between the lever element and the rod element, in a second state, in which electrical power with a second power value, which is greater than or equal to the first power value, is applied to the shape memory alloy element, the shape memory alloy element is further shortened in such a way that the tilted lever element is displaced parallel in the direction of the tensile force exerted by the shape memory alloy element and, as a result, brings about a movement of the rod element along the rod axis, in a third state, in which electrical power with a third power value, which is smaller than the first power value, is applied to the shape memory alloy element, the tilted lever element is at least partially tilted back and, as a result, the non-positive connection between the lever element and the rod element is released, and in a fourth state, in which electrical power with a fourth power value, which is smaller than or equal to the third power value, is applied to the shape memory alloy element, the at least partially tilted back lever element is displaced parallel in the direction of the restoring force exerted by the restoring element.

2. The linear drive as claimed in claim 1, wherein the first axis and the second axis are arranged parallel to each another.

3. The linear drive as claimed in claim 2, wherein the rod axis is arranged parallel to the first axis and parallel to the second axis.

4. The linear drive as claimed in claim 1, wherein the bearing element is configured to block a movement of the rod element in direction of the restoring force acting on the lever element.

5. The linear drive as claimed in claim 1, wherein the bearing element has a first bearing on a first side of the lever element and a second bearing on a second side of the lever element opposite the first side.

6. The linear drive as claimed in claim 1, wherein the third power value and the fourth power value are equal to zero.

7. The linear drive as claimed in claim 1, wherein the restoring element is configured as an additional shape memory alloy element which, when electrical power is applied, exerts an additional tensile force on the lever element, which acts counter to the tensile force exerted by the shape memory alloy element connected to the first portion.

8. The linear drive as claimed in claim 1, furthermore further comprising an initial position contact which contacts the lever element, which is at least partially tilted back and displaced parallel to and in direction of the restoring force, and thereby signals the fourth state.

9. The linear drive as claimed in claim 8, wherein the initial position contact contacts the lever element at an initial position contact portion of the lever element, which is arranged such that the initial position contact portion is arranged between the through bore and the second portion of the lever element.

10. The linear drive as claimed in claim 1, further comprising an end position contact which contacts the tilted lever element, which is displaced parallel to and in direction of the tensile force, and thereby signals the second state.

11. The linear drive as claimed in claim 10, wherein the end position contact contacts the lever element at an end position contact portion of the lever element, which is arranged such that the first portion and the second portion of the lever element are arranged between the end position contact portion and the through bore.

12. The linear drive as claimed in claim 1, wherein the lever element in addition to the first portion and the second portion has a third portion and a fourth portion, wherein the first portion and the second portion are arranged on a first side with respect to the rod element, the third portion and the fourth portion are arranged on a second side opposite the first side with respect to the rod element, and the fourth portion is arranged between the third portion and the through bore, and wherein the linear drive furthermore has the following components:

a second shape memory alloy element which extends along a third axis and the length of which is adjustable by application of electrical power, wherein a first end of the second shape memory alloy element is connected to the third portion of the lever element, a second end of the second shape memory alloy element opposite the first end is stationarily connected to a third fixed bearing, and the second shape memory alloy element is configured to exert a second tensile force acting along the third axis on the lever element when electrical power is applied, the second tensile force acts in the opposite direction to the tensile force exerted by the shape memory alloy element connected to the first portion, a second restoring element extending along a fourth axis, wherein a first end of the second restoring element is connected to the fourth portion of the lever element, a second end of the second restoring element opposite the first end is stationarily connected to a fourth fixed bearing, and the second restoring element exerts a second restoring force which acts along the fourth axis and acts counter to the second tensile force exerted by the second shape memory alloy element, wherein, when electrical power is applied to the second shape memory alloy element and without electrical power being applied to the shape memory alloy element, the movement of the rod element is reversed.

13. The linear drive as claimed in claim 1, further comprising:

a second shape memory alloy element which extends along the first axis and the length of which is adjustable by application of electrical power, wherein a first end of the second shape memory alloy element is connected to the first portion of the lever element, a second end of the second shape memory alloy element opposite the first end is stationarily connected to a third fixed bearing, and the second shape memory alloy element is configured to exert a second tensile force acting along the first axis on the lever element when electrical power is applied, the second tensile force acts in the opposite direction to the tensile force exerted by the shape memory alloy element connected to the first portion, a second restoring element extending along the second axis, wherein a first end of the second restoring element is connected to the second portion of the lever element, a second end of the second restoring element opposite the first end is stationarily connected to a fourth fixed bearing, and the second restoring element exerts a second restoring force which acts along the second axis and acts counter to the second tensile force exerted by the second shape memory alloy element, wherein, when electrical power is applied to the second shape memory alloy element and without electrical power being applied to the shape memory alloy element, the movement of the rod element is reversed.

14. The linear drive as claimed in claim 13, wherein the first restoring element is a first shape memory alloy additional element which, when electrical power is applied, exerts a first additional tensile force on the lever element, which acts counter to the tensile force exerted by the shape memory alloy element connected to the first portion, and the second restoring element is a second shape memory alloy additional element which, when electrical power is applied, exerts a second additional tensile force on the lever element, which acts counter to the second tensile force exerted by the second shape memory alloy element connected to the first portion.

15. A linear drive arrangement, comprising:
a linear drive as claimed in claim 1, and
at least one second linear drive arranged spaced apart from the linear drive as claimed in claim 1, wherein the rod elements of the at least two linear drives are configured as a common rod element,
the linear drive and the at least one second linear drive comprised in at least two linear drives.

16. The linear drive arrangement as claimed in claim 15, further comprising an activation unit which is configured to activate the at least two linear drives in such a way that only one of the at least two linear drives changes from the first state in direction of the second state.

17. The linear drive arrangement as claimed in claim 15, wherein the restoring element is configured as an additional shape memory alloy element which, when electrical power is applied, exerts an additional tensile force on the lever element, which acts counter to the tensile force exerted by the shape memory alloy element connected to the first portion.

* * * * *